United States Patent
Fredman

(10) Patent No.: US 11,613,262 B2
(45) Date of Patent: Mar. 28, 2023

(54) DRIVER ASSIST DESIGN ANALYSIS SYSTEM

(71) Applicant: CCC INTELLIGENT SOLUTIONS INC., Chicago, IL (US)

(72) Inventor: Marc Fredman, Chicago, IL (US)

(73) Assignee: CCC INTELLIGENT SOLUTIONS INC., Chicago, IL (US)

(*) Notice: Subject to any disclaimer, the term of this patent is extended or adjusted under 35 U.S.C. 154(b) by 0 days.

(21) Appl. No.: 16/936,842

(22) Filed: Jul. 23, 2020

(65) Prior Publication Data

US 2020/0346656 A1 Nov. 5, 2020

Related U.S. Application Data

(62) Division of application No. 15/649,863, filed on Jul. 14, 2017, now Pat. No. 10,730,526.

(51) Int. Cl.
*B60W 40/09* (2012.01)
*B60W 50/10* (2012.01)
(Continued)

(52) U.S. Cl.
CPC .............. *B60W 40/09* (2013.01); *B60K 28/02* (2013.01); *B60W 30/08* (2013.01); *B60W 30/10* (2013.01);
(Continued)

(58) Field of Classification Search
CPC .. B60W 40/09; B60W 50/0098; B60W 50/04; B60W 50/10; B60W 50/08;
(Continued)

(56) References Cited

U.S. PATENT DOCUMENTS 8,566,126 B1  10/2013 Hopkins, III
9,147,353 B1   9/2015 Slusar
(Continued)

FOREIGN PATENT DOCUMENTS

DE  10 2015 209969 A1  12/2016
DE  10 2015 218361 A1   3/2017
EP      3 159 853 A1    4/2017

OTHER PUBLICATIONS

Extended European Search Report for Application No. 18180163.0, dated Nov. 29, 2018.
(Continued)

*Primary Examiner* — Marthe Y Marc-Coleman
(74) *Attorney, Agent, or Firm* — Marshall, Gerstein & Borun LLP

(57) ABSTRACT

A driver assist design analysis system includes a processing system and a database that stores vehicle data, vehicle operational data, vehicle accident data, and environmental data related to the configuration and operation of a plurality of vehicles with driver assist systems or features. The driver assist design analysis system also includes one or more analysis engines that execute on the processing system to determine one or more driving anomalies (e.g., accidents or poor driving operation) based on the vehicle operational data, and that correlate or determine a statistical relationship between the driving anomalies and the operation of the driver assist systems or features. The driver assist design analysis system then determines an effectiveness of operation of one or more of the driver assist systems or features based on the statistical relationship to determine a potential design flaw in the driver assist systems or features, and the driver assist design analysis system notifies a user or receiver of the potential design flaw.

32 Claims, 2 Drawing Sheets

(51) Int. Cl.
    *B60W 50/08*   (2020.01)
    *B60W 30/08*   (2012.01)
    *B60W 30/10*   (2006.01)
    *G08G 1/16*    (2006.01)
    *B60K 28/02*   (2006.01)
    *B60W 50/00*   (2006.01)
    *B60W 50/04*   (2006.01)
    *B60W 30/18*   (2012.01)
    *G07C 5/08*    (2006.01)

(52) U.S. Cl.
    CPC ........ *B60W 50/0098* (2013.01); *B60W 50/04* (2013.01); *B60W 50/08* (2013.01); *B60W 50/10* (2013.01); *G08G 1/16* (2013.01); *B60T 2201/08* (2013.01); *B60W 30/18009* (2013.01); *B60W 30/18163* (2013.01); *B60W 2050/0018* (2013.01); *B60W 2900/00* (2013.01); *G07C 5/0808* (2013.01)

(58) Field of Classification Search
    CPC ................ B60W 30/08; B60W 30/10; B60W 30/18009; B60W 30/18163; B60W 2050/0018; B60W 2900/00; B60W 2556/10; B60W 50/00; B60W 30/02; H08G 1/16; B60K 28/02; G07C 5/0808; B60T 2201/08; G06Q 40/08; G08B 21/182
    See application file for complete search history.

(56) References Cited

U.S. PATENT DOCUMENTS

| | | | |
|---|---|---|---|
| 9,454,786 B1 | 9/2016 | Srey et al. | |
| 9,773,281 B1* | 9/2017 | Hanson | H04W 4/023 |
| 9,792,656 B1* | 10/2017 | Konrardy | G08G 1/205 |
| 10,129,458 B2* | 11/2018 | Li | H04N 5/2351 |
| 10,185,999 B1* | 1/2019 | Konrardy | G07C 5/008 |
| 10,334,049 B2 | 6/2019 | Stenneth et al. | |
| 10,730,526 B2 | 8/2020 | Fredman | |
| 10,853,882 B1* | 12/2020 | Leise | G06T 5/50 |
| 2007/0156220 A1 | 7/2007 | Kaplan et al. | |
| 2010/0131304 A1 | 5/2010 | Collopy et al. | |
| 2012/0089299 A1 | 4/2012 | Breed et al. | |
| 2013/0024060 A1 | 1/2013 | Sukkarie et al. | |
| 2013/0083196 A1 | 4/2013 | Zheng | |
| 2013/0131893 A1 | 5/2013 | Nakao et al. | |
| 2013/0179198 A1 | 7/2013 | Bowne et al. | |
| 2013/0302758 A1 | 11/2013 | Wright | |
| 2013/0304514 A1 | 11/2013 | Hyde et al. | |
| 2014/0111647 A1 | 4/2014 | Atsmon et al. | |
| 2015/0015416 A1 | 1/2015 | Kim | |
| 2015/0039350 A1 | 2/2015 | Martin et al. | |
| 2015/0112504 A1 | 4/2015 | Binion et al. | |
| 2015/0244826 A1 | 8/2015 | Stenneth | |
| 2016/0277911 A1* | 9/2016 | Kang | H04W 4/90 |
| 2017/0006135 A1 | 1/2017 | Siebel et al. | |
| 2017/0113664 A1 | 4/2017 | Nix | |
| 2017/0255966 A1 | 9/2017 | Khoury | |
| 2017/0278323 A1 | 9/2017 | Gupta et al. | |
| 2018/0086350 A1 | 3/2018 | Kible et al. | |
| 2018/0127001 A1 | 5/2018 | Ricci | |
| 2020/0233420 A1 | 7/2020 | Liu et al. | |
| 2020/0273268 A1 | 8/2020 | Bhattacharyya et al. | |
| 2020/0346656 A1 | 11/2020 | Fredman | |
| 2022/0005291 A1* | 1/2022 | Konrardy | G07C 5/008 |

OTHER PUBLICATIONS

Van der Laan et al., "A Simple Procedure for the Assessment of Acceptance of Advanced Transport Telematics," Transportation Research, 5(1):1-10 (1997).

Office Action for European Application No. 18180163.0, dated Aug. 31, 2021.

* cited by examiner

DRIVER ASSIST DESIGN ANALYSIS SYSTEM

CROSS REFERENCE TO RELATED APPLICATION

This application is a divisional application claiming priority from U.S. patent application Ser. No. 15/649,863, filed Jul. 14, 2017, entitled "Driver Assist Design Analysis System," the entire disclosure of which is hereby expressly incorporated by reference herein.

TECHNICAL FIELD

This patent relates to a vehicle driver assist processing system and technique, and more particularly, to a processing system and methodology that analyzes the design of advanced driver assistance systems (ADASs) to detect design flaws in these systems.

DESCRIPTION OF THE RELATED ART

Driver assist systems, also sometimes called advanced driver assistance systems (ADASs), generally provide information or feedback to a driver of a vehicle (e.g., an automobile) to alert the driver to potential problems or hazards (e.g., a blind spot warning system, a distance detection system, etc.) or to automatically take control of part of a vehicle (e.g., a braking system, a steering system, a lane following system, etc.) to avoid collisions or accidents. In some cases, it is expected that driver assist systems will soon be developed to automatically control a vehicle without a human driver, so-called "driverless vehicles." In any case, many different types of driver assist systems (or driver assist features) exist or are currently being developed and provided in the marketplace as part of high end features on automobiles, and as part of driverless vehicle prototypes. Driver assist systems can include one or more driver assist features integrated into a vehicle driving system, such as an automatic braking system, a distance warning system, an automatic turning system, an automatic or semi-automatic collision avoidance system, an adaptive cruise control system, an automated parking system, one or more detection systems that alert a driver to hazards or other vehicles, a lane following system that maintains the vehicle in the correct lane, etc., all of which operate in conjunction with a human driver to assist the driver in driving or controlling a vehicle. In some cases, a driver assist system may be a completely automatic control system that drives a vehicle without the aid of a human, including performing navigating, braking, accelerating, turning, etc. There are currently many designs and prototypes of driverless vehicle systems and/or driver assist systems and features being developed, tested and introduced into the marketplace, but the absolute and/or relative performance of many or most of these systems is still unknown.

While many driver assist systems or features will be thoroughly tested prior to introduction into the marketplace, there may still be hidden flaws or weaknesses in these systems, once introduced, that may not be easily detectable or observable in typical testing situations. For example, certain ones of these driver assist systems or features may not operate properly or completely satisfactorily when a combination of factors are present, such as when the car is turning to the left in the rain, etc. As such, it may take years for a driver assist system manufacturer to be able to detect that there may be a problem with the driver assist system or feature, which may lead to needless injuries and death, not to mention increased damages due to accidents caused by these improperly or poorly designed systems.

Moreover, because the use of driver assist system components is in its infancy, there are no known standards or benchmarks on which to perform an absolute or comparative analysis of the performance of these driver assist components or systems. As a result, driver assist system and vehicle manufacturers are left with implementing haphazard methodologies for analyzing the effectiveness of these driver assist systems or features.

Additionally, there are still numerous questions about who will be responsible for accidents and other damage caused by the failure of, or the improper design of, one or more driver assist components or systems within a vehicle. For example, in some cases, such as when none of the driver assist system features is engaged or is active in an accident, crash, or other loss, the driver's or vehicle owner's insurance company will generally be responsible for the damage. However, if one or more of the driver assist system components of a driver assist system is active during the accident, crash, or other loss, then the vehicle manufacturer (or its insurance company) may be liable for some or all of the damage, especially when the driver assist system failed or did not operate properly. In still other cases, such as when the driver assist system component of a vehicle is engaged during an accident or loss, but operates properly and does not cause the accident, the driver's or automobile owner's insurance company will still generally be responsible for the damage. In situations in which the driver assist system is a completely driverless vehicle solution, the vehicle manufacturer, driver assist manufacturer, or their insurance company may be liable for the damage. The manner of sorting out who is responsible for such damage is still unknown, and there is currently no known mechanism for quickly assessing liability of or even assuring that the correct party is put on notice of an accident for which the party is or may be responsible.

SUMMARY

A driver assist design analysis system includes a processing system and a database that collects and stores vehicle data and vehicle operational data related to the operation of a plurality of vehicles (e.g., automobiles) with and potentially without driver assist system components or features. The processing system implements analysis modules which operate to analyze the vehicle data and the vehicle operational data from, typically, many vehicles, to detect driver anomalies from the vehicle operational data and to determine a statistical relationship between these driving anomalies and the operation of the driver assist systems or features. The processing system then determines, based on the statistical relationship, whether a potential design flaw exists within a driver assist system or feature and notifies the vehicle or driver assist system manufacturer of any detected potential design flaws. This system enables vehicle and driver assist system manufacturers to quickly analyze the effectiveness of these systems and to detect problems or glitches in the driver assist systems as actually installed in and operating in vehicles.

The vehicle data stored in the driver assist system design apparatus database may include identity data defining the vehicle (make, model, year, vehicle identification number, e.g.), features of the vehicle (color, body style, driver assist system components if any), etc. The vehicle operational data stored in the design analysis system database may include data indicative of or defining the operation of a vehicle both while the driver assist system component or components were engaged and were not engaged, and in particular may store any desired or available data indicative or defining the operation of the vehicle during accidents or during times at which the vehicle experienced a near accident or other hazardous event (all of which are referred to herein as driving anomalies), and/or during other periods of normal operation of the vehicle during which time no driving anomalies occurred. The vehicle operational data may be telematics data collected by or generated by various sensors on the vehicle. The telematics data may include, for example, acceleration and deceleration data, braking data, speed data, global positioning system (GPS) data, turning data, whether one or more components of the vehicle was engaged (e.g., heated seats, radio, telephone, windshield wipers, etc.), and to what extent or level. Still further, the data may indicate whether one or more of the driver assist components was engaged and to what extent. Also, the design analysis system database may store environmental data, such as data identifying or indicating weather or road conditions, such as rain, fog, ice, dry, extreme heat or cold, etc.

As noted above, the driver assist system design apparatus also includes analysis modules that determine one or more driving anomalies (e.g., accidents or poor driving operation) based on the vehicle operational data, and that correlate or determine a statistical relationship between the driving anomalies and the operation of one or more driver assist systems or features. The driver assist design analysis system then determines an effectiveness of operation of the one or more of the driver assist systems or features based on the statistical relationship to determine a potential design flaw in the driver assist system or feature and notifies a user or a receiver of the potential design flaw.

In one case, a driver assist system design apparatus includes a processor, a computer readable memory, a vehicle database storing vehicle information regarding a plurality of different vehicles, including driver assist system data specifying one or more driver assist systems used in the different vehicles and a vehicle operational database storing vehicle operational data for multiple ones of the plurality of different vehicles having driver assist systems. In this case, the vehicle operational data collected from each of the multiple ones of the plurality of different vehicles having driver assist systems reflects operation of the different vehicles during actual operation of the different vehicles. Moreover, the driver assist system design apparatus includes a design analysis engine stored in the computer readable memory that operates on the processor to (1) detect a driving anomaly during operation of one or more of the plurality of different vehicles based on the vehicle operational data within the vehicle operational database, (2) determine a statistical relationship (e.g., a correlation) between the driving anomaly and a particular driver assist system based on the vehicle operational data within the vehicle operational database, and (3) detect a potential design flaw within the particular driver assist system based on the determined statistical relationship. Still further, the driver assist design apparatus includes a notification engine that operates on the processor to notify a receiver of the potential design flaw detected in the particular driver assist system.

If desired, the driver assist system data may specify a type of driver assist system, one or more features of a driver assist system as installed in one or more vehicles, a revision of a driver assist system or of a driver assist system feature as installed in a vehicle, and/or one or more driver assist features of a driver assist system. The one or more driver assist features may include, for example, a lane changing or following feature, a blind spot warning feature, a driverless parking feature, a driver assisted parking feature, an automatic braking feature, a distance determination feature, or a distance warning feature.

Moreover, if desired, the notification engine may notify a driver assist system manufacturer, a vehicle manufacturer, or an insurer of the potential design flaw. The driver assist system design apparatus may also include an insurance rate calculation engine that calculates an insurance rate for a vehicle based on the potential design flaw. In some cases, the vehicle operational database may store time based data sets of vehicle operation, wherein each time based data set includes a set of vehicle operational data for a particular time or for a particular range of times, and each of the time based data sets of vehicle operation may include data indicating if a driver assist system was engaged at the time.

In other cases, the design analysis engine of the driver assist design apparatus may obtain vehicle operational data from the vehicle operational database for one or more of the plurality of vehicles and use time based data sets in which a driver assist feature was engaged to determine the statistical relationship. Likewise, the design analysis engine may obtain vehicle operational data from the vehicle operational database for one or more of the plurality of vehicles and use time based data sets in which a driver assist feature was not engaged to determine the statistical relationship. In other cases, the design analysis engine may compare detected driver anomalies for time based data sets in which a driver assist feature was engaged with detected driver anomalies for time based data sets in which a driver assist feature was not engaged to determine a statistical relationship.

In another case, a method of detecting a flaw in a driver assist system as installed on one or more vehicles includes collecting vehicle information regarding a plurality of different vehicles, including driver assist system data (specifying one or more driver assist systems used in the plurality of different vehicles), collecting vehicle operational data for multiple ones of the different vehicles having driver assist systems (wherein the vehicle operational data reflects operation of the different vehicles during actual operation of the different vehicles) and storing the vehicle information and the vehicle operational data in a vehicle database. The method further includes using a processor to access the vehicle operational data within the vehicle database for one or more of the plurality of different vehicles having a particular driver assist system, using the processor to detect a driving anomaly during operation of one or more of the plurality of different vehicles based on the analyzed vehicle operational data, and using the processor to determine a statistical relationship between the driving anomaly and a particular driver assist system based on the vehicle operational data within the vehicle database. Likewise, the method includes using the processor to detect a potential design flaw within the particular driver assist system based on the determined statistical relationship and notifying a receiver of the potential design flaw detected in a particular driver assist system.

In another embodiment, a routing system includes an accident detection system that determines the existence of an accident in a vehicle having one or more driver assist features, a vehicle operational database that collects vehicle operational data from or about a vehicle at the time of an accident in which the vehicle was involved, and a rules database that stores one or more sets of rules relating to fault based on one or more vehicle operational states during a vehicle accident. The routing system also includes a fault determination system that operates on a processor to access the vehicle operational database to collect vehicle operational data for a particular vehicle when the accident detection system determines that the particular vehicle has been in an accident, to access a set of rules in the rules database relating to fault for the particular vehicle, to determine one or more vehicle states of the vehicle at the time of the accident based on the vehicle operational data for the particular vehicle at the time of the accident, and to determine a responsible party based on the vehicle states and the accessed set of rules. The routing system further includes a routing engine that operates on a processor to route a claim for the accident of the particular vehicle to the responsible party as determined by the fault determination system.

If desired, the fault determination system may operate on the processor to determine multiple (e.g., two or more) responsible parties for a particular accident, and may determine a proportional liability for each of the two or more responsible parties. In this case, the notification engine may notify each of the determined responsible parties. In any case, the responsible party or parties may include one of a driver, a vehicle owner, a driver assist system manufacturer, a vehicle manufacturer, or an insurance company or other agent of any of these entities.

The fault determination system may determine one or more vehicle states of the vehicle at the time of the accident based on the vehicle operational data for the particular vehicle at the time of the accident and may determine if one or more driver assist features was engaged at the time of the accident, if one or more of the driver assist features was operating properly at the time of the accident, and/or if a human driver was actively driving the vehicle at the time of the accident or interfering with the operation of the driver assist feature. The fault determination system may determine if a human driver was actively driving the vehicle at the time of the accident by detecting, from the operational data, steering, braking, or acceleration, caused by the human driver. The fault determination system may determine a detected operational state of driver assist system at the time of the accident, and the detected operational state of driver assist system at the time of the accident may indicate a known problem with the driver assist system. In this case, the fault determination system may detect if the known problem with the driver assist system was communicated to the driver prior to the accident. The fault determination system may also detect if the driver assist system was properly serviced at time of accident.

If desired, the accident detection system may determine the existence of an accident in a vehicle having one or more driver assist features based on a receipt of a claim filed for the accident, or based on telematic data collected by the vehicle during the accident, for example.

In another embodiment, a method of processing an accident claim includes determining, via a processor, the existence of an accident of a vehicle having one or more driver assist features, collecting and storing vehicle operational data from or about the vehicle in the accident related to the vehicle at the time of the accident and storing rules in a rules database, wherein the rules in the rules database include one or more sets of rules relating to fault based on one or more vehicle operational states during the vehicle accident. The method also includes determining, via a processor, a responsible party for the accident by accessing the vehicle operational database to determine vehicle operational data pertaining to the vehicle, accessing a set of rules in the rules database relating to fault for the vehicle, determining one or more vehicle states of the vehicle at the time of the accident based on the vehicle operational data for the vehicle at the time of the accident, and determining a responsible party based on the vehicle operational states and the accessed set of rules. The method also includes routing, via a communication network, a claim for the accident of the vehicle to the responsible party.

DETAILED DESCRIPTION

Figure 1:
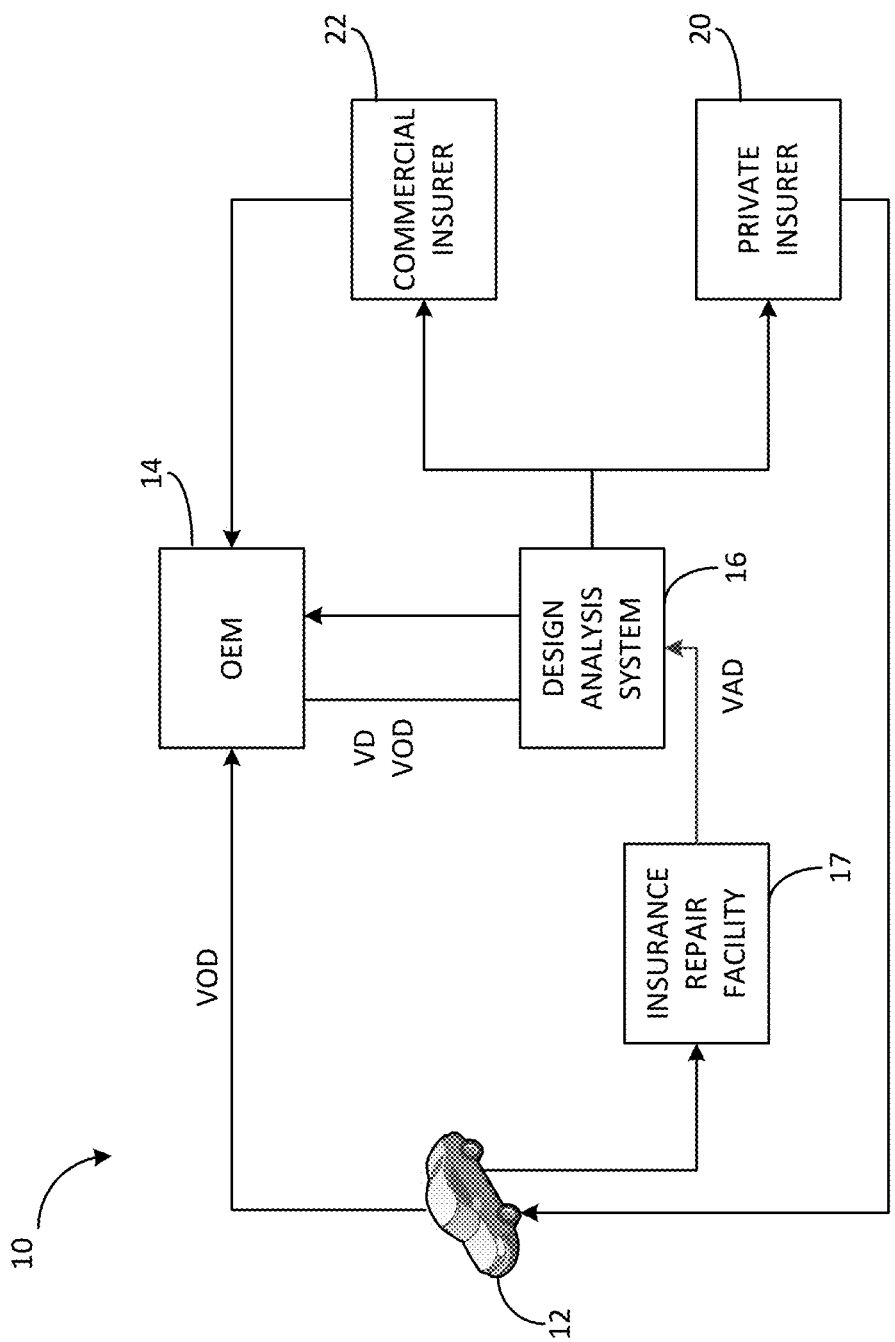
FIG. 1 depicts a flow chart illustrating data flow in a driver assist design analysis system.

FIG. 1 illustrates a data flow and communication diagram 10 in a driver assist design analysis system that detects potential design flaws in driver assist systems as used in vehicles, and/or a data flow diagram used in a routing system that routes claims to one or more various potential responsible parties for vehicle accidents in vehicles having driver assist features. Generally speaking, vehicle operational data from or about one or more vehicles 12 is generated (e.g., on board the vehicle 12 by the various sensors on the vehicle 12) and is sent to an original equipment manufacturer (OEM) 14 and/or to a driver assist design analysis system 16. The vehicle operational data may be, for example, telematic data that is collected by the vehicle 12 and that is typically sent to the OEM 14 or to an insurance provider or other user via any desired communication connection, including an internet connection, a wireless or wired connection, etc. As is known, in many cases, vehicle insurance systems collect vehicle data and accident data, generally referred to as telematic data, to analyze and predict repair costs, insurance costs, and to set insurance premiums. This data may include, for example, braking data, speed data, turning data, driving distance data for a particular driver, time of day data, environmental data (e.g., data indicative of environmental conditions such as rain, fog, ice, cold weather, snow, etc.), global positioning system (GPS) data, etc. In many cases, these insurance systems use statistical processing techniques to determine likely or expected repair costs, accident costs, likelihood of accidents, etc.

As a result, the vehicle operational data sent from the vehicles 12 in the diagram of FIG. 1 may receive this data and thus may include all types of vehicle operational data, which may be organized into time based data sets in which the values of various vehicle parameters are collected and time stamped for particular times or ranges of time. In some cases, the vehicle operational data may include speed, acceleration, vehicle direction, steering position, braking or brake positions, GPS data, etc. The vehicle operational data may also include the operational states of various components of the vehicle, such as lights (exterior and interior), windshield wipers (and speed thereof), radio, telecommunications systems, on-vehicle entertainment systems, engine characteristics, anti-lock braking systems, gear or transmission positions, positions of windows and doors (opened or closed, for example), tire pressure sensor readings, etc. The telematic data may also include various environmental condition data, such as exterior temperature, the presence of rain, snow, ice or fog, the outputs of skid or tire spinning detection systems, time of day, ambient brightness or light, wind or wind direction, etc. Still further, the vehicle operational data may include operational data related to one or more driver assist systems or features, including the type and nature of the system and/or features (e.g., manufacturer, revision, latest update, update history, service record, etc.), the operational state of the driver assist system or feature (e.g., if the driver assist system or feature was on or engaged, or was off, at each particular time), the maintenance status of the driver assist system or feature, such as the latest applied revision, the latest maintenance applied to the driver assist system or feature, etc.

As noted above, the vehicles 12 may provide the vehicle operational data to the OEMs 14 and/or to the design analysis system 16 using any on-line, or real-time data collection system or communication connection, using periodic downloads via a communication connection, using maintenance system download systems, using accident investigation systems, etc. That is, the vehicle operational data may be collected in the vehicle 12 and may be provided to the OEM 14 and/or to the design analysis system 16 in real time, or may be stored in the vehicle 12 and provided to the OEM 14 and/or the design analysis system 16 at various intervals or convenient times when, for example, the vehicle 12 is connected to a wired or wireless internet or other large area network (LAN), when the vehicle 12 is undergoing routine maintenance, when the vehicle 12 is in an accident and is connected to an accident investigation computer or other connection, etc. Likewise, the vehicle operational data may be provided as part of an accident claim. Still further, the vehicle operational data may be communicated from the vehicle 12 to the OEM 14 and/or the design analysis system 16 using any desired communication connection, including a hardwired connection, a connection via an intermediary device (such as a computer connected to the vehicle data collection system via a hardwired or short range wireless communication connection), a wireless connection, etc.

Additionally, as illustrated in FIG. 1, the OEMs 14 may provide vehicle data (VD) and any collected vehicle operational data (VOD) for particular vehicles 12 to the design analysis system 16 for storage in and/or use by the design analysis system 16. For example, the OEM 14 may provide vehicle data pertaining to the makeup and features of various vehicles (e.g., cars, trucks, motorcycles, etc.) manufactured by the OEM 14. The vehicle data may include, for each particular vehicle, a model, a make, a body type, vehicle features, a vehicle identification number (VIN) and any other vehicle description or identification data. The vehicle data may also include data pertaining to or describing one or more automatic driver assist systems or driver assist features of the various vehicles. Such driver assist system data may include a manufacturer, a type, a feature set, a revision or update, a serial number, etc. of a driver assist system or feature as provided on or within each vehicle.

Of course, the vehicle data (including the driver assist system data) and the vehicle operational data may be provided from the OEM 14 to the design analysis system 16 via any data communication connection, such as the Internet, a Bluetooth connection or some combination of wireless and wired connections. Moreover this data may be provided on-line and in real-time or may be provided via batch downloads to the design analysis system 16, or in any other desired manner.

Still further, as illustrated in FIG. 1, vehicle accident data (VAD) may be provided to the driver assist design analysis system 16 from one or more insurance or repair facilities 17. Such vehicle accident data may include data pertaining to past accidents of various vehicles having vehicle data as stored within the vehicle database of the design analysis system 16. The vehicle accident data may include, for example, data pertaining to or describing the damage caused to a vehicle in an accident, the location of the damage, the body parts effected by the damage, whether airbags were deployed, the cost of repair to the vehicle, the types of repair to the vehicle, information regarding the cause and/or nature of the accident (e.g., driver error, vehicle malfunction, improper turn, running a red light or stop sign, excessive speed), a location of the accident (e.g., on a highway or other type of road), environmental conditions at the accident (rain, sleet, ice, ambient temperature, etc.), and any other data defining the accident or the damage caused by the accident.

Generally speaking, the design analysis system 16 may be a processor based system that includes a database for storing various vehicle data, vehicle operational data, vehicle accident data and, if desired, environmental data, and an analysis engine that may execute different types of analyses on the collected and stored data. In particular, the design analysis system 16 may run analyses on the vehicle data, the vehicle operational data, the vehicle accident data, and the environmental data as stored in the database to determine the effectiveness of one or more automatic driver assist systems (ADASs) as installed in the vehicles, such as a driver assist system as installed in a particular make/model of vehicle, a driver assist system as installed in a particular make of vehicle, a driver assist system as installed in different makes and/or types of vehicles (e.g., a driver assist system as installed in sedans, as installed in SUVs, as installed in coupes, etc., of the same or different vehicle manufacturers). Likewise, the design analysis system 16 may run an analysis of the operational effectiveness of a particular driver assist system feature, such as an automatic braking feature, a lane detection or following feature, a parking feature, etc. of a particular driver assist system. These analyses may, again, be run on various different sets of vehicle data, such as data for all vehicles including the feature of a particular driver assist system, for all vehicles of a particular manufacturer with a particular driver assist system, for vehicles of a particular make from a particular manufacturer with a particular driver assist system, for vehicles of a particular type or body style (coupe, four-wheel drive, SUV, etc.) having a particular driver assist system installed therein, for all vehicles made by any vehicle manufacturer having a particular driver assist system or feature, etc.

Generally speaking, the design analysis system 16 will execute one or more analyses of the vehicle data and the vehicle operational data and the vehicle accident data and the environmental data to determine the effectiveness of or a statistical relationship (such as a correlation) between the operation of the driver assist system or feature as running or installed in a set of vehicles, and a risk of an accident or a loss, and/or a likely severity of an accident or loss when using those systems. Moreover, the design analysis system 16 may determine particular situations (e.g., road types, speeds, environmental conditions, turning situations, etc.) in which the driver assist systems or components of the driver assist systems are not operating as effectively or as well as the OEM 14 would like. Generally speaking, the design analysis system 16 may run various different statistical or regression analyses (such as correlation or other regression analyses) on the data as stored for the various vehicles during times at which driving anomalies (e.g., accidents, hard braking events, hard acceleration events, high speed turns, etc.) occurred, as well as during times when driving anomalies did not occur. The design analysis system 16 may compare the operation of a driver assist system or feature during these various times to determine a statistical measure of or a statistical relationship between the occurrence of a driving anomaly and the use of driver assist system or some feature of the driver assist system. Still further, to provide this statistical measure or relationship, the design analysis system 16 may compare the operation of one driver assist system or one feature of a driver assist system of one type (e.g., of one manufacturer) to the operation of another driver assist system or feature of another type (e.g., of another manufacturer). Such comparative analyses may include comparisons of similar driver assist systems or features made by different driver assist system manufacturers, of similar driver assist systems or features of the same driver assist system manufacturer on different types of vehicles, of the same basic driver assist system or feature of a particular driver assist system manufacturer but having different revisions or updates installed therein, etc.

In any event, the design analysis system 16 may then compare the determined statistical measure (e.g., correlation) to a baseline value or other threshold to determine if the operation of the analyzed driver assist system or feature is worse than the baseline amount, meaning that there may be a design flaw in the driver assist system or feature preventing the system or feature from being as effective as desired. The design analysis system 16 may also or instead compare the statistical measures of different driver assist systems (e.g., driver assist systems from different manufacturers, different revisions of the same basic driver assist system, etc.) to determine a comparative effectiveness of these systems. As a result, the design analysis system 16 may use the determined statistical measure or relationship to determine a potential design flaw (or weakness) in the driver assist system or feature. The design analysis system 16 also may provide the statistical analysis and/or some refined analysis, such as notification of a higher-than-average or higher-than-expected correlation analysis over a particular threshold back to the OEM 14 (or to a driver assist system manufacturer), to allow the OEM 14 or the driver assist system manufacturer to determine or look into the possibility that the driver assist system is not performing as well as the OEM 14 or manufacturer would like. Still further, the design analysis system 16 may notify other users, such as insurers, of high or abnormal statistical measures, to enable insurers to set rates or to use the design flaw analysis in setting rates for insuring the vehicles or in setting insurance rates for the vehicle manufacturer or driver assist system manufacturer based on the measured or determined operation of the driver assist system.

Thus, as illustrated in FIG. 1, the design analysis system 16 may be communicatively connected to one or more private insurers 20 and/or commercial insurers 22 and may provide notifications to the private insurers 20 and/or to the commercial insurers 22 about driver assist system analyses as installed in vehicles, rates associated with these driver assist systems, or other factors pertaining to effectiveness of the operation of the analyzed driver assist systems, which may be used by the insurers to establish rates, either for private owners of vehicles 12 or for product-warranty insurance for OEMs 14 of the vehicles 12 or the driver-assist systems installed within the vehicles 12.

Moreover, in another case, the system 16 may implement an on-line or automatic claim processing system that automatically or quickly determines a fault associated with an accident of a particular vehicle 12 and/or that determines one or more responsible parties associated with a particular accident in a particular vehicle when a driver assist system is installed on a vehicle 12 involved in the accident. Thus, the system 16 may provide a notification to either a commercial insurer 22 or a private insurer 20 (or both), via any desired communication network, indicating that the particular insurer is fiscally responsible for the accident based on the factors involved in the accident. In particular, the system 16 may store a set of rules in a rules database, and may include a fault determination engine that uses the various rules within the rules database to determine a fiscally responsible party associated with an accident or a claim. The system 16 may thus determine whether a private insurer 20 that insures the owner or driver of a vehicle 12 or whether a commercial insurer 22 (e.g., the insurer who warrants the proper operation of the driver assist system or of a vehicle in which the driver assist system is located) is the fiscally responsible party for an accident. In either case, the system 16 may quickly route claims to the correct commercial or private insurer based on an analysis of and a determination of the fiscally responsible party or parties for the accident. The system 16 may make this determination based on an analysis of the vehicle operational data, and/or the vehicle accident data, from the accident, as well as the rules to be used in determining the fault. In many cases, the rules may be specified by logic as determined by contractual relationships between the automobile manufacturer, the driver assist system manufacturer, insurers, and owners or users of the vehicles in which the driver assist systems are installed. These rules may thus be updated or changed based on contractual changes or change in the insurance laws regarding responsible parties.

Figure 2:
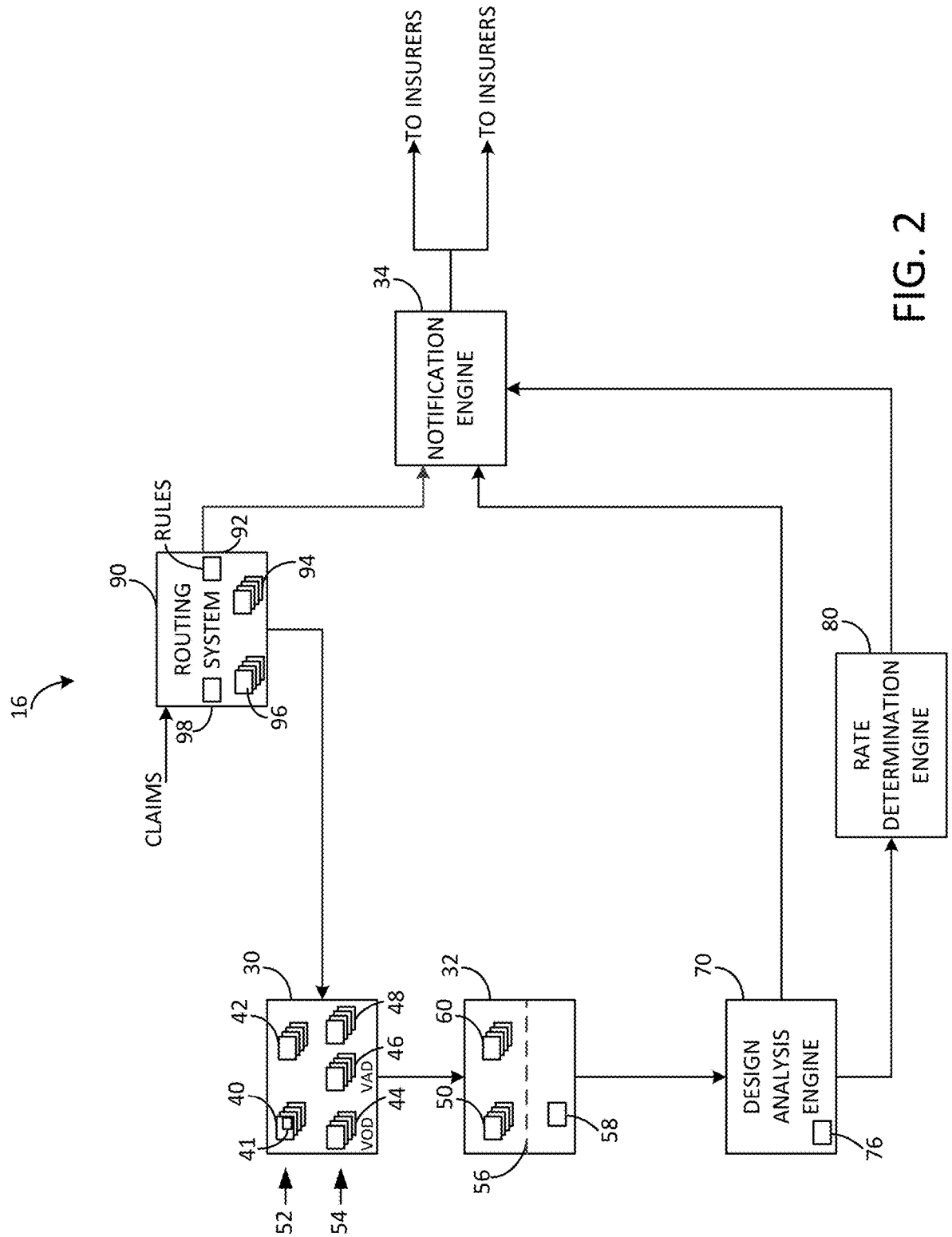
FIG. 2 depicts an exemplary processing system that can be used to detect design flaws or operational flaws in one or more driver assist systems as installed in vehicles, and to route claims based on detected operational states of a vehicle during an accident.

FIG. 2 depicts a more detailed block diagram of an example of the design analysis system 16 of FIG. 1. The example design analysis system 16 as depicted in FIG. 2 includes a vehicle-data database 30, an analysis engine 32, and a notification engine 34 coupled to the analysis engine 32. In particular, the vehicle-data database 30 is a computer readable memory of any desired type that stores data collected by and about various vehicles 12 (of FIG. 1). More particularly, the vehicle-data database 30 may store and collect data from actual vehicle operation, from OEMs 14 (FIG. 1), and/or from other external sources (such as from data sources connected via the internet or sensors near roads on which vehicles travel). The vehicle data stored in the vehicle-data database 30 may be any of the data discussed above, including the vehicle data 40, driver assist systems data 42, vehicle operational data 44, vehicle accident data 46, and environmental data 48. In particular, the vehicle-data database 30 may store vehicle data 40 for each vehicle being tracked, or for which data is associated, including a VIN, type, model, make, year, color and features of each particular vehicle, for example. The vehicle data 40 may include vehicle specific driver assist system data 41 defining or indicating a driver assist system or driver assist system features that are on or installed within the particular vehicle. The driver assist system data 41 may include, for example, one or more identification numbers, types, brands, model numbers, serial numbers, manufacturers, etc. for the driver assist system or feature(s) installed on the particular vehicle. The driver assist system data 41 may also include indications of the revisions or updates that have been provided to and incorporated in or installed in the driver assist system software, hardware or firmware of the driver assist system as installed on the particular vehicle including, for example, any recall modifications have been made or incorporated into the driver assist system or driver assist feature.

Moreover, the vehicle-data database 30 may include or store driver assist system data 42 that describes or provides more general information or data about various driver assist systems that are incorporated into one or more of the vehicles for which vehicle data is stored in the database 30. The driver assist system data 42 may describe or define the features of, the operations for, etc., different driver assist systems or different driver system assist features as manufactured by separate or different manufacturers, including different vehicle manufacturers. That is, in some situations, the driver assist system data 42 stored within the database 30 may define different types, brands, models, etc. of driver assist systems or features that are available and/or that are installed in vehicles for which vehicle data 40 is collected. In some cases, a particular driver assist system defined by the driver assist system data 42 may be installed in different vehicles, including in different vehicle types made by the same vehicle manufacturer or in different vehicles made by different vehicle manufacturers. The driver assist system data 42 may store or indicate features of each driver assist system, such as which features the system has, upgrades available to be provided to driver assist system, various models, makes, revisions, etc. of the driver assist systems, as well as other data about these driver assist systems.

Still further, the vehicle-data database 30 may store vehicle operational data 44, including vehicle operational data associated with individual vehicles being tracked or for which operational data is received from the vehicles 12 themselves, from the OEMs 14, or from some other source. Such vehicle operational data may be any type of operational data, including speed data, braking data, acceleration data, traveling distance data, direction data, global positioning system (GPS) data, etc. As indicated above, the vehicle operational data may be stored as sets of time stamped or time correlated data, each set of time based data having values for various vehicle parameters (e.g., sensor measurements) collected at each time or within a range of times. Still further, the vehicle database 30 may store vehicle accident data 46, which may be indicative of damage that occurred to vehicles in accidents, repairs and repair costs, repair times, parts lists, work orders, etc. associated with accidents of particular vehicles. Additionally, this data or the vehicle operational data 44 may include vehicle operational data collected by the vehicle or other source during the accident, as well as data generated by adjustors, repair personnel, etc. after the accident. The vehicle accident data 46, as indicated above, may include any accident or claim related data for each of a number of particular accidents, including a type of accident, the relevant vehicle or vehicles involved in the accident, statistical data or vehicle data collected during or shortly before or after the time of the accident. This data may also include an indication of the severity of an accident, details including types and descriptions of damage to the vehicle, costs associated with repairing the vehicle, and other costs associated with fixing the vehicle or servicing a claim with respect to the vehicle involved in an accident.

Still further, the vehicle-data database 30 may store environmental data 48 that may be indicative of environmental conditions or environmental data associated with vehicle operational data 44 or the vehicle accident data 46. As noted above, the environmental data 48 may include temperatures, whether it was raining, whether it was slick, or there were icing conditions, whether it was daylight or dark or dusk, etc., and any other data defining or regarding driving conditions at particular times and in particular locations. Much of the environmental condition data stored in the database 48 may be collected by a vehicle (e.g., by temperature or other sensors on the vehicle). However, this data may also be obtained from third-party sources, such as from weather applications, private service providers, etc. which provide weather data (e.g., temperature, precipitation, sunlight, sunrise and sunset times, etc.) about various geographic locations.

As indicated in FIG. 2, vehicle data 40, driver assist system data 42, vehicle operational data 44, vehicle accident data 46, and environmental data 48 may be provided to the database 30 on ongoing basis or a real-time basis from actual vehicles that are on the road via an input 52, or vehicle data may be provided by other sources, such as an OEM 14 via an input 54. Likewise, the vehicle database 30 may have a data collection engine that automatically, or in response to user prompts, goes out and obtains various kinds of data, such as environmental data 48, vehicle data 40, vehicle accident data 46, vehicle operational data 46, etc., from the relevant sources of that data. As will be understood, new data may be collected about various vehicles for which data is being collected at any desired times or rates.

Still further, as illustrated in FIG. 2, the analysis engine 32 is communicatively coupled to the vehicle data database 30. The analysis engine 32 includes one or more statistical analysis modules 50 which use the data in the database 30 to perform one or more statistical analyses to detect or determine various statistical relationships between driving situations and the operation (or non-operation) of one or more of the driver assist systems or features, as defined in the driver assist system data 42. The modules 50, which are stored in a computer readable memory 56 and are executed on a processor 58, may be or may include, for example, various regression or correlation analyses that may be run or that may be applied to different sets of the data within the vehicle database 30 to determine or detect operational statistics or information about the operation of the various driver assist (ADAS) systems, such as the driver assist systems 42, based on the actual operation of these systems within the vehicles as captured by the vehicle data 40, the vehicle operational data 44, and the vehicle accident data 46, in combination with different environmental conditions as defined by the environmental data 48 to which these vehicles were subjected at various times.

During operation, the analysis engine 32 may execute one or more of the modules or routines 50 at any time or times, and the modules 50 may apply any kind of regression analysis or other statistical analysis to the data within the database 30 to determine the effectiveness of the operation of one or more of the driver assist systems or features 42. Generally speaking, the analysis engine 32 may first execute one or more detection routines 60, wherein each detection routine 60 determines or detects one or more driving anomalies in the vehicle operational data 40 and/or the vehicle accident data 46. Such driving anomalies may be, for example, actual accidents, such as accidents defined by or associated with data within the vehicle accident data 46. However, driving anomalies may be other dangerous, less desirable or undesirable driving operations (or conditions) that do not result in an actual accident, such as hard braking events, hard turning events, quick acceleration events, sudden stops, slipping tires, locked tires (e.g., skids), or other driving events which are indicative of a poor driving, a near accident, or the last second avoidance of a possible accident. The driving anomaly detection routines or modules 60 may cull through the vehicle operational data 44 to detect one or more driving anomalies of the same or different types. A separate module 60 may be provided for each different type of driving anomaly to be detected, if desired, or a single module 60 may detect more than one type of driving anomaly.

In any event, the analysis engine 32 may then execute the modules 50 to determine a relationship between the operation of one or more driver assist systems or driver assist system features and the occurrence of one or more driving anomalies as detected by the modules 60. In one example, the analysis engine 32, or a driving anomaly detection module 60 thereof, may cull through the vehicle operational data 44 and/or the vehicle accident data 46 for the operation of vehicles with a particular driver assist system or driver assist feature. The detection module 60 may search for driving anomalies in this vehicle data (e.g., vehicle operational data and/or vehicle accident data) for vehicles that have the particular type of driver assist system or feature, as defined by the vehicle data 40, for example. The detection module 60 may also sub-divide the analyzed data or limit the analyzed data to a particular model/revision/upgrade etc. of a driver assist system or feature to thereby analyze the operation of vehicles having the particular driver assist system revision or feature revision therein. In any event, the driving anomaly detection routines 60 may then find one or more driving anomalies in the collected data. The driving anomaly detection routines 60 may also determine, for each detected driving anomaly, whether the driver assist system or the driver assist feature was engaged or in use at the time and, if the driver assist system has various levels of engagement, at what level or setting the driver assist system or feature was engaged. If desired, the driving anomaly detection routines 60 may detect one or more types of driving anomalies in vehicles in which the driver assist system was engaged and in which the driver assist system was not engaged to enable better determination of correlations or relationships between the use of a particular driver assist system or feature and driving anomalies, such as accidents, as well as to the severity of accidents.

The analysis modules 50 may determine a statistical measure or relationship between the operation of a particular driver assist system or feature and the operation of the vehicle based on the detected driving anomalies (or accidents) to thereby determine an effectiveness of operation of the particular driver assist system or feature. In some cases, the modules 50 may determine a statistical relationship between the use of a driver assist system or feature and the statistical cost of repair of a vehicle in a claim, e.g., at the first notice of loss (FNOL). In other cases, the modules 50 may perform other analyses to determine other statistical measures or relationships related to the likelihood of accidents or loss when using a driver assist system or feature.

The statistical modules 50 may analyze data in any desired manner to determine statistical relationships between any type or subset of vehicles, driver assist systems, driver assist system features, etc., and the detected or determined driving anomalies. Thus, for example, the statistical modules 50 may operate to determine statistical relationships based on a type of vehicle having a driver assist system or feature, all vehicles that have a particular driver assist system or feature, etc. To perform this analysis, the modules 50 may search for driving anomalies detected within the vehicle operational data 44 and vehicle accident data 46 for vehicles (e.g., for vehicles in the vehicle data 40) with those types of systems or features, may run a regression analysis or other statistical analysis that determines a statistical indication that indicates, for example, the likelihood of an accident, the probability of or the severity of an accident, or the likely or expected loss or cost of repair in an accident, based on that data over a particular period of time, such as a particular number of driving hours, etc.

Moreover, the statistical modules 50 may look for secondary or other factors that increase or decrease the correlation between the operation of a driver assist system or feature and a driving anomaly, such as environmental conditions (rain), vehicle operational data (e.g., turning left, braking, speed, direction, etc.) For example, the analysis engine 32 may run an analysis while correlating driving anomalies with driver assist systems or features in addition to environmental data, by looking at data vehicle operational data 44 and vehicle accident data 46 in which different environmental conditions are present (or are not present), to determine if, for example, a driver assist system or feature operates better or worse in certain types of environmental conditions, such as in rain or in slippery conditions, as compared to sunny or bright-daylight conditions. In a similar manner, the analysis engine 32 may execute an analysis by correlating driving anomalies with driver assist systems or features in addition to various types of vehicle operations or vehicle states (e.g., turning left, braking, accelerating, etc., or any combination of vehicle operations) by looking at vehicle operational data 44 in which the various types of vehicle operations or states are present and/or are not present. Of course the analysis engine 32 may run various different types of analyses based on the data within the database 30 to determine one more statistical relationship (e.g., correlation factors) for each driver assist system, or each driver assist system feature, and may provide the determined statistical relationships (e.g., correlation factors) to a design analysis engine 70.

Generally speaking, the design analysis engine 70 may use the one or more determined statistical relationships (which may be correlation factors, for example, expected accident cost, likelihood of accidents, etc.) developed by the system 32 to determine if there is a potential design flaw in a particular driver assist system or feature. For example, the design analysis engine 70 may compare the statistical relationship developed by a particular driver assist system analysis (from the engine 32) based on vehicle operational data in which the driver assist system was engaged or operating to the statistical relationship developed by a similar analysis performed on vehicle operational data in which the driver assist system was not engaged, or to the statistical relationship developed by a similar analysis performed on vehicle operational data in which the driver assist system was engaged some of the time but not all of the time. In another case, the design analysis engine 70 may compare the statistical relationship for a particular driver assist system analysis based on vehicle operational data in which the driver assist system was engaged or operating to a base-line threshold (which may be predetermined by a user, an OEM 14 or other entity) to determine if the determined statistical relationship is worse (e.g., higher than) the base-line threshold. In still another case, the design analysis engine 70 may compare the statistical relationship developed by a particular driver assist system analysis for a particular driver assist system based on vehicle operational data in which the particular driver assist system was engaged or operating to a statistical relationship developed for a different (e.g., a base-line) driver assist system analysis in which the different driver assist system was engaged (and based on similar vehicle operational data in which the two driver assist systems were engaged or operating) to determine the manner in which the particular driver assist system operates with respect to the base-line driver assist system. Of course, the design analysis engine 70 may perform any other analyses or comparisons of one or more determined statistical relationships to determine a relative score or effectiveness of operation of a particular driver assist system or feature.

Still further, if the design analysis engine 70 determines that a particular score or statistical relationship is poor or indicates a worse than expected, allowed, or designed effectiveness, (e.g., the determined statistical relationship is greater than a stored threshold amount), then the notification engine 34 may notify one or more users, such as an OEM 14, that the driver assist system or feature may not be operating as well as it could be (i.e., that the system or feature has a potential design flaw). If desired, the OEM 14 (or other receiver of the notification) may determine or look at the vehicle operational data in more detail to determine the conditions under which the system is not operating as designed or desired, and may redesign the driver assist system or reprogram the driver assist system to operate better based on this collection of data and notification.

It will be understood that the analysis engine 32 can execute or implement various analyses on any combination of the vehicle operational data 44, vehicle accident data 46, environmental data 48, etc. and may run analyses on a driver assist system as a whole or may run an analysis one or more of the features of a driver assist system separately, so as to determine whether particular features of driver assist systems are operating well or not as well based on the detected driving anomaly indications. In some cases, the analysis engine 32 may perform analyses on the operation of vehicles based on driving anomalies detected in or associated with vehicle accident data only or on vehicle operational data only (in which no accidents occurred), but in other cases the analysis engine 32 may perform analyses on the operation of vehicles based on driving anomalies detected in both vehicle operational data not associated with an accident as well as vehicle operational data associated with vehicle accidents, to determine the operation or effectiveness of a driver assist system or feature that is being analyzed. In one case, the analysis engine 32 may review or analyze data from a particular vehicle or from all vehicles or from a subset of vehicles having a particular driver assist system or driver assist feature, and determine when that driver assist system or driver assist feature is on, determine a correlation or likelihood of accident or other type of driver anomaly based on the actual operation of the driver assist system when the driver assist system is on, and may do the same for the vehicle operation when the driver assist system is off or not being used. In this case, the analysis engine 32 or the design analysis engine 70 may make a comparison between the two determined statistical relationships to determine whether there is a higher likelihood of accident or of driving anomalies when the driver assist system is off (not engaged) as opposed to when the driver assist system is on (engaged). As noted above, a driving anomaly may be an accident, but could be any other severe driving operation, such as hard-braking, hard-turning, spinning, engagement of skid-control or anti-locking brakes, etc., which do not actually result in an accident at the time.

If desired, the correlation or other statistical relationship indications (numbers) could be stored in a correlation database 76 and may be provided to a user or other recipient if these numbers are sufficiently bad (high, e.g.) enough to warrant notifying a third party, such as an OEM 14 or a driver assist system manufacturer, of a potentially poorly designed system. The notification engine 34 may notify a user or owner of the poorly designed driver assist system or a manufacturer of the driver assist system (or the vehicle in which the driver assist system is incorporated) of the poor effectiveness of the driver assist system or feature, and may provide statistical data or other data indicating the particular circumstances that led to the high correlation, such as environmental conditions or other driving conditions (e.g., when the vehicle is typically turning left or right, the vehicle is being operated at night, the vehicle is being operated in the rain, etc.) that statistically give rise to or is correlated with the poor performance of the driver assist system.

Still further, a rate notification engine or a rate determination engine 80 may use the correlation numbers stored in the database 76 for various vehicles or driver assist systems (along with any other data typically used in calculating insurance rates or premiums) to establish or perform rate calculations for determining insurance costs, either for commercial insurance companies, such as insurers that insure vehicle manufacturers or driver assist system manufacturers, or for private insurance companies that insure private vehicles or the owners or drivers of private vehicles. Thus, the results of the design analysis engine 70 may be used to establish insurance rates, quotes, etc., for drivers or manufacturers based on the operation of vehicles with driver assist systems and the determined effectiveness of the driver assist systems.

Still further, the analysis system 16 of FIG. 2 may include a claim routing engine 90 that may use the vehicle operational data 44 and/or the vehicle accident data 46 as provided to or as stored in the database 30 to route a claim for an accident. In this case, the claim routing engine 90 includes a rules database 92 that stores one or more rules that are used to determine faults in an accident, or to determine a responsible party for a particular accident (e.g., whether the driver or the OEM or the driver assist system manufacturer is liable for the damage in the accident). More particularly, the claim routing system 90 receives an indication of an accident via the receipt of a claim, or via vehicle accident data 46 being loaded into the database 30, for example. The data and or the claim may come from a vehicle itself (via the receipt of telematic data from a vehicle), from an insurance company with which a claim is filed, from an OEM 14 or vehicle manufacturer that manufactured the vehicle or that manufactured the driver assist system involved in the accident, or from a claim filer, if desired.

Once the claim routing engine 90 receives a notification that an accident has occurred, the claim routing engine 90 (which may be implemented as a routine stored in a computer readable memory and executed on a processor) obtains the relevant vehicle data as stored in or collected by the database 30, such as the vehicle data 40, the vehicle accident data 46, the vehicle operational data 44, the driver assist system data 42, and/or the environmental data 48, and may access one or more rules in the rules database 92 to analyze this data to determine a responsible party or parties for the accident. The responsible party is a party or entity (which may be a person, a manufacturing company, an insurance company, etc.) that is legally responsible for the repair or damage caused in the accident, either because of contractual relationships or by operation of one or more relevant laws.

More particularly, the claim routing engine 90 may use or execute (on a processor) one or more vehicle operational state determination modules 94, which analyze the vehicle operational data 44 or the vehicle accident data 46 for the accident to determine one or more operational states of the vehicle at the time of the accident (e.g., immediately before, during and/or after the accident). The one or more operational states of the vehicle may indicate various states associated with the vehicle or components of the vehicle at the time of the accident, such as whether the vehicle was accelerating or braking or coasting, whether the vehicle was turning or going straight, the direction of movement of the vehicle before or during the accident, the position of the driver controlled acceleration pedal, brake pedal, steering wheel, etc. Any number of vehicle states may be determined by the various telematic data collected for a vehicle during an accident. In many cases, the claim routing engine 90 determines the state of the driver assist system or of one or more features of the driver assist system, from the vehicle operational data 44 or the vehicle accident data 46, including for example, whether the driver assist system or feature of the vehicle was engaged in the vehicle at the time of the accident. Upon determining the vehicle operational states, other claim analysis modules 96 may determine based on the rules in the rule database 92, who was at fault or the responsible party based on the combination of vehicle operational states. Thereafter, the claim routing system 90 may determine one or more potential responsible parties for the accident based on the fault determination. The responsible parties may include, for example, the OEM of the vehicle (which may be determined from the vehicle data 40), the driver assist system manufacturer (which may be determined from the vehicle data 42), an insurer for the OEM or the driver assist system manufacture (which may be stored in, for example, a database 98 of the claim routing system 90 or which may be provided via a claim), or an insurance company for the driver or owner of the vehicle (which may come from the claim, for example, but which could be provided in the vehicle data 40 or obtained elsewhere).

Of course, during this process, the fault determination modules 98, which execute on a processor, may access use one or more rules in the rules database 92 to determine from the vehicle operational state data and possibly other data (such as environmental data, vehicle data including vehicle operational data) if the operation of the driver assist system during the accident was responsible for or contributed to the accident, whether the driver assist system was at fault, or whether a driver of the automobile or vehicle was at fault. In the case of various driver assist features that are intended to be hands-off and thus not to be engaged by the owner or driver of the vehicle (such as an automatic parking feature, a totally automatic driver assist system, etc.), the claim routing engine 90 may determine if those systems were engaged at the time of the accident and, if so, determine that the driver assist system was at fault for the accident. In this case, the claim routing engine 90 may notify the OEM 14 or the driver assist system insurer (22 of FIG. 1) of the claim to be paid or covered by that insurer. On the other hand, if none of the driver assist system features of the driver assist system on the vehicle was engaged or on at the time of the accident, then the claim routing engine 90 may determine, based on rules in the rules database 92, that the driver was at fault and may route the claim to an insurer associated with driver. Of course, in this case, the claim routing system 90 may store insurance data pertaining to the proper insurers or the responsible insurers for each of the vehicles or for each of the driver-assist systems, e.g., the vehicle manufacturers, and/or for the drivers or vehicle owners themselves.

In other cases, the claim routing system 90 may access other, more complicated or involved rules in the rules database 92 to determine fault or responsibility. For example, more complicated rules may be used in situations in which a driver assist system was engaged but was intended only to warn the driver (i.e., was not designed to completely prevent accidents), or when the driver assist system operated properly and/or was still not responsible for the accident, or when the driver assist system was engaged but may not have operated correctly during the accident and thus may have been partially or completely responsible for the accident, or when the driver assist system was engaged but was thwarted in operation by actions of the driver, or when the driver assist system was engaged but had a known (self-detected) problem that had been communicated to the driver prior to the accident, or when the driver assist system was engaged but was not properly serviced or upgraded. That is, for example, an automatic braking system may have been engaged and may have operated properly during an accident (which may be determined based on the vehicle accident data 46 or the vehicle operational data 44), but may still may not have been able to prevent the accident. Moreover, in some cases, the claim routing engine 90 may determine that the driver interfered with the operation of the driver assist system or feature by, for example, turning the steering wheel, impeding the steering wheel, pressing on the brake or the accelerator when the driver assist system was trying to accelerate or brake, respectively, or taking some other action to impede or thwart the operation of the driver assist system. In still other cases, the claim routing engine 90 may determine (from the vehicle state determination modules 98) if the driver assist system was properly maintained prior to the accident (such as receiving the latest updates or upgrades, was serviced as called for in a recall notice, etc.) when determining if the driver assist system was responsible for the accident. In still other cases, the claim routing engine 90 may determine if the driver was using the driver assist system despite the driver assist system having detected a problem with itself and having notified the driver of the problem.

As will be understood, various different rules in the rules database 92 may be set up or defined to cover various different types of accidents or combinations of actions during accidents that might affect the determination of fault and thus the determination of a responsible party. The claim routing engine 90 determines the state of the relevant features or components of the vehicle at the time of the accident and applies the rules as stored in the rules database 92 based on these states to determine fault, and thus is able to determine one or more responsible parties. As noted above, a determination of responsible parties may include determining which insurance company is responsible for covering the damage within a particular accident based on the vehicle accident data, the vehicle operational data, the vehicle data, the environmental data, etc. Still further, in some cases, the claim routing engine 90 may determine that there are multiple responsible parties and may use one or more rules in the rules database 92 to apportion fault between the parties based on the collected vehicle data, vehicle operational data, vehicle accident data, environmental data, etc. Thus, in this case, the claim routing engine 90 may determine a percentage or portion of fault or responsibility for each of the multiple responsible parties.

In any event, the claim routing system 90 uses the rules in the rules database 92 to determine fault and/or faults and may route a claim as received by the system 16 to the proper insurance company or other party that is responsible for covering the accident, thereby increasing the speed at which the claims are processed, as well as providing for a neutral or third-party analysis or determination of fault (or at least an initial determination) when a vehicle with a driver assist system is involved in an accident.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Any of these modules, units, components, etc. may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules or routines can provide information to, and receive information from, other hardware and/or software modules and routines. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing an image processing application and system for configuring and executing the techniques disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

The invention claimed is:

1. A routing system, comprising:
an accident detection system that determines the existence of an accident in a vehicle having one or more driver assist features;
a vehicle operational database that collects vehicle operational data from or about a vehicle at the time of an accident to the vehicle;
a rules database that stores one or more sets of rules relating to responsibility for damage resulting from a vehicle accident based on one or more vehicle operational states related to a driver assist feature on the vehicle during a vehicle accident wherein the one or more sets of rules are based, at least in part, on contractual or legal relationships between the vehicle owner and one or more driver assist feature providers;
a fault determination system that operates on a processor to:
access the vehicle operational database to collect vehicle operational data for a particular vehicle when the accident detection system determines that the particular vehicle has been in an accident;
access a set of rules in the rules database relating to responsibility for damage for the particular vehicle;
determine one or more vehicle states of the vehicle at the time of the accident based on the vehicle operational data for the particular vehicle at the time of the accident; and
determine a responsible party as between (1) the vehicle owner and/or its insurance company and (2) a driver assist feature provider and/or its insurance company based on the vehicle states and the accessed set of rules; and
a routing engine that operates on a processor to route a claim for the accident of the particular vehicle to the responsible party as determined by the fault determination system.

2. The routing system of claim 1, wherein the fault determination system operates on the processor determines multiple responsible parties for a particular accident.

3. The routing system of claim 1, wherein the fault determination system operates on the processor to determine two or more responsible parties and to determine a proportional liability for each of the two or more responsible parties.

4. The routing system of claim 3, wherein the notification engine notifies each of the determined responsible parties.

5. The routing system of claim 1, wherein the responsible party includes one of a driver or an insurance company.

6. The routing system of claim 1, wherein the responsible party includes one of a driver assist system manufacturer or a vehicle manufacturer.

7. The routing system of claim 1, wherein the responsible party includes a vehicle owner insurance company.

8. The routing system of claim 1, wherein the fault determination system determines one or more vehicle states of the vehicle at the time of the accident based on the vehicle operational data for the particular vehicle at the time of the accident and includes determining if one or more driver assist features was engaged at the time of the accident.

9. The routing system of claim 1, wherein the fault determination system determines one or more vehicle states of the vehicle at the time of the accident based on the vehicle operational data for the particular vehicle at the time of the accident and includes determining if one or more of the driver assist features was operating at the time of the accident.

10. The routing system of claim 9, wherein the fault determination system detects if the driver assist system was properly serviced at the time of accident.

11. The routing system of claim 1, wherein the fault determination system determines one or more vehicle states of the vehicle at the time of the accident based on the vehicle operational data for the particular vehicle at the time of the accident and includes determining if a human driver was actively driving the vehicle at the time of the accident.

12. The routing system of claim 11, wherein the fault determination system determines if a human driver was actively driving the vehicle at the time of the accident by detecting, from the operational data, steering, braking, or acceleration, caused by the human driver.

13. The routing system of claim 12, wherein the fault determination system determines a detected operational state of driver assist system at the time of the accident.

14. The routing system of claim 1, wherein the accident detection system determines the existence of an accident in a vehicle having one or more driver assist features based on a receipt of a claim filed for the accident.

15. The routing system of claim 1, wherein the accident detection system determines the existence of an accident in a vehicle having one or more driver assist features based on telematic data collected by the vehicle during the accident.

16. A routing system, comprising:
an accident detection system that determines the existence of an accident in a vehicle having one or more driver assist features;
a vehicle operational database that collects vehicle operational data from or about a vehicle at the time of an accident to the vehicle;
a rules database that stores one or more sets of rules relating to responsibility for damage resulting from a vehicle accident based on one or more vehicle operational states related to a driver assist feature on the vehicle during a vehicle accident;
a fault determination system that operates on a processor to;
  access the vehicle operational database to collect vehicle operational data for a particular vehicle when the accident detection system determines that the particular vehicle has been in an accident;
  access a set of rules in the rules database relating to responsibility for damage for the particular vehicle;
  determine one or more vehicle states of the vehicle at the time of the accident based on the vehicle operational data for the particular vehicle at the time of the accident; and
  determine a responsible party based on the vehicle states and the accessed set of rules; and
a routing engine that operates on a processor to route a claim for the accident of the particular vehicle to the responsible party as determined by the fault determination system;
wherein the fault determination system determines a detected operational state of driver assist system at the time of the accident and wherein the detected operational state of driver assist system at the time of the accident indicates a known problem with the driver assist system.

17. The routing system of claim 16, wherein the fault determination system detects if a known problem with the driver assist system was communicated to the driver prior to the accident.

18. A method of processing an accident claim, comprising:
determining, via a processor, the existence of an accident of a vehicle having one or more driver assist features;
collecting and storing vehicle operational data from or about the vehicle in the accident related to the vehicle at the time of an accident;
storing rules in a rules database, wherein the rules in the rule database include one or more sets of rules relating to responsibility for damage resulting from a vehicle accident based on one or more vehicle operational states related to a driver assist feature of the vehicle during the vehicle accident wherein the one or more sets of rules are based, at least in part, on contractual or legal relationships between the vehicle owner and one or more driver assist feature providers;
determining, via a processor, a responsible party for the accident, including;
  accessing the vehicle operational database to determine vehicle operational data pertaining to the vehicle;
  accessing a set of rules in the rules database relating to responsibility for damage for the vehicle;
  determining one or more vehicle states of the vehicle at the time of the accident based on the vehicle operational data for the vehicle at the time of the accident; and
  determining a responsible party as between (1) the vehicle owner and/or its insurance company and (2) a driver assist feature provider and/or its insurance company based on the vehicle states and the accessed set of rules; and
routing, via a communication network, a claim for the accident of the vehicle to the responsible party.

19. The method of claim 18, wherein determining a responsible party based on the vehicle states and the accessed set of rules includes determining the multiple responsible parties.

20. The method of claim 18, wherein determining a responsible party based on the vehicle states and the accessed set of rules includes determining two or more responsible parties and determining a proportional liability for each of the two or more responsible parties.

21. The method of claim 18, wherein routing, via a communication network, a claim for the accident of the vehicle to the responsible party includes routing the claim to an insurance company.

22. The method of claim 18, wherein routing, via a communication network, a claim for the accident of the vehicle to the responsible party includes routing the claim to an insurance company of a driver assist system manufacturer or to an insurance company of a vehicle manufacturer.

23. The method of claim 18, wherein routing, via a communication network, a claim for the accident of the vehicle to the responsible party includes routing the claim to an insurance company of a driver or owner of the vehicle.

24. The method of claim 18, wherein determining one or more vehicle states of the vehicle at the time of the accident includes determining if one or more driver assist features was engaged at the time of the accident.

25. The method of claim 24, wherein determining one or more vehicle states of the vehicle at the time of the accident includes determining if one or more driver assist features was operating at the time of the accident.

26. The method of claim 24, wherein determining one or more vehicle states of the vehicle at the time of the accident includes determining if a human driver was actively driving the vehicle at the time of the accident.

27. The method of claim 26, wherein determining one or more vehicle states of the vehicle at the time of the accident includes determining if a human driver was actively driving the vehicle at the time of the accident by detecting, from the operational data, steering, braking, or acceleration, caused by the human driver.

28. The method of claim 24, wherein determining one or more vehicle states of the vehicle at the time of the accident includes determining a detected operational state of the driver assist system at the time of the accident.

29. The method of claim 24, wherein determining one or more vehicle states of the vehicle at the time of the accident includes determining if the driver assist system was properly serviced at the time of accident.

30. The method of claim 18, wherein determining, via a processor, the existence of an accident of a vehicle having one or more driver assist features includes determining the existence of an accident in the vehicle based on a receipt of a claim filed for the accident.

31. The method of claim 18, wherein determining, via a processor, the existence of an accident of a vehicle having one or more driver assist features includes determining the existence of an accident in the vehicle based on telematic data collected by the vehicle during the accident.

32. A method of processing an accident claim, comprising:
    determining, via a processor, the existence of an accident of a vehicle having one or more driver assist features;
    collecting and storing vehicle operational data from or about the vehicle in the accident related to the vehicle at the time of an accident;
    storing rules in a rules database, wherein the rules in the rule database include one or more sets of rules relating to responsibility for damage resulting from a vehicle accident based on one or more vehicle operational states related to a driver assist feature of the vehicle during the vehicle accident;
    determining, via a processor, a responsible party for the accident, including;
        accessing the vehicle operational database to determine vehicle operational data pertaining to the vehicle;
        accessing a set of rules in the rules database relating to responsibility for damage for the vehicle;
        determining one or more vehicle states of the vehicle at the time of the accident based on the vehicle operational data for the vehicle at the time of the accident; and
        determining a responsible party based on the vehicle states and the accessed set of rules; and
    routing, via a communication network, a claim for the accident of the vehicle to the responsible party;
    wherein determining one or more vehicle states of the vehicle at the time of the accident includes determining if there was a known problem with the driver assist system at the time of the accident.

\* \* \* \* \*